US012620107B2

(12) United States Patent
Wang et al.

(10) Patent No.:   US 12,620,107 B2
(45) Date of Patent:      May 5, 2026

(54) ENHANCED DEPTH ESTIMATION USING DEEP LEARNING

(71) Applicant: Massachusetts Institute of Technology, Cambridge, MA (US)

(72) Inventors: Shaoxiong Wang, Cambridge, MA (US); Branden Romero, Brighton, MA (US); Yu She, West Lafayette, IN (US); Edward Adelson, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 386 days.

(21) Appl. No.: 18/280,940

(22) PCT Filed: Jan. 6, 2022

(86) PCT No.: PCT/US2022/011363
§ 371 (c)(1),
(2) Date: Sep. 7, 2023

(87) PCT Pub. No.: WO2022/191910
PCT Pub. Date: Sep. 15, 2022

(65) Prior Publication Data
US 2024/0153115 A1      May 9, 2024

Related U.S. Application Data

(60) Provisional application No. 63/158,327, filed on Mar. 8, 2021.

(51) Int. Cl.
*G06T 7/50*          (2017.01)
*G06T 15/00*         (2011.01)
*G06V 10/141*        (2022.01)
(52) U.S. Cl.
CPC ................ *G06T 7/50* (2017.01); *G06T 15/00* (2013.01); *G06V 10/141* (2022.01)

(58) Field of Classification Search
CPC .......... G06T 7/50; G06T 15/00; G06V 10/141
See application file for complete search history.

(56) References Cited

U.S. PATENT DOCUMENTS 8,411,140 B2    4/2013  Adelson
9,815,198 B2   11/2017  Davis
(Continued)

FOREIGN PATENT DOCUMENTS

WO     WO 2012/129410 A2     9/2012
WO     WO 2020/051458 A1     3/2020
(Continued)

OTHER PUBLICATIONS

International Search Report and Written Opinion for International Application No. PCT/US2022/011363 dated May 5, 2022.
(Continued)

*Primary Examiner* — Vu Le
*Assistant Examiner* — Matthew James Bodnark
(74) *Attorney, Agent, or Firm* — Wolf, Greenfield & Sacks, P.C.

(57)              ABSTRACT

Retrographic sensors described herein may provide smaller sensors capable of high-resolution three-dimensional reconstruction of an object in contact with the sensor. Such sensors may be used by robots for work in narrow environments, fine manipulation tasks, and other applications. To provide a smaller sensor, a reduced number of light sources may be provided in the sensor in some embodiments. For example, three light sources, two light sources, or one light source, may be used in some sensors. When fewer light sources are provided, full color gradient information may not be provided. Instead, the missing gradients in one direction or other information related to a three-dimensional object in contact with the sensor may be determined using gradients in a different direction that were provided by the (Continued)

real data. This may be done using a trained statistical model, such as a neural network, in some embodiments.

20 Claims, 9 Drawing Sheets

(56)                    References Cited

U.S. PATENT DOCUMENTS

| | | | |
|---|---|---|---|
| 2009/0315989 A1 | 12/2009 | Adelson | |
| 2020/0246980 A1* | 8/2020 | Kuppuswamy | ...... B25J 15/0033 |
| 2020/0355619 A1* | 11/2020 | Haynes | ................. G01B 17/02 |

FOREIGN PATENT DOCUMENTS

| | | | |
|---|---|---|---|
| WO | WO 2020/228489 A1 | 11/2020 | |
| WO | WO 2021/076697 A1 | 4/2021 | |
| WO | WO 2022/132300 A2 | 6/2022 | |

OTHER PUBLICATIONS

International Preliminary Report on Patentability (Chapter 1) for International Application No. PCT/US2022/011363 dated Sep. 21, 2023.

Bauza et al., Tactile Mapping and Localization from High-Resolution Tactile Imprints. ICRA. May 2019: 7 pages.

Donlon et al., GelSlim: A High-Resolution, Compact, Robust, and Calibrated Tactile-sensing Finger. IROS. Oct. 2018:1927-34. doi: 10.1109/IROS.2018.8593661.

Hashizume et al., Capacitive sensing for a gripper with gecko-inspired adhesive film. IEEE Robotics Auto Lett. Apr. 2019; 4(2): 677-683.

Hellman et al., Functional Contour-following via Haptic Perception and Reinforcement Learning. IEEE Trans Haptics. Jan. 2018;11(1):61-72.

Lepora et al., From Pixels to Percepts: Highly Robust Edge Perception and Contour Following Using Deep Learning and an Optical Biomimetic Tactile Sensor. IEEE Robot Autom Lett. Apr. 2019;4(2):2101-7.

Li et al., End-to-end pixelwise surface normal estimation with convolutional neural networks and shape reconstruction using GelSight sensor. Proc IEEE Int Conf Robot Biomimet. Dec. 2018: 6 pages.

Li et al., Localization and manipulation of small parts using GelSight tactile sensing. Int Con Intelligent Robot Syst. Sep. 2014:3988-93. doi: 10.1109/IROS.2014.6943123.

Tian et al., Manipulation by Feel: Touch-Based Control with Deep Predictive Models. ICRA. May 2019:818-24. doi: 10.1109/ICRA.2019.8794219.

Wang et al., GelSight wedge: measuring high-resolution 3D contact geometry with a compact robot finger. IEEE ICRA. May-Jun. 2021: 8 pages.

Yuan et al., Active Clothing Material Perception Using Tactile Sensing and Deep Learning. ICRA. May 2018:4842-9.

Yuan et al., GelSight: High-resolution robot tactile sensors for estimating geometry and force. Sensors. 2017; 17(12): 2762. 21 pages.

* cited by examiner

200

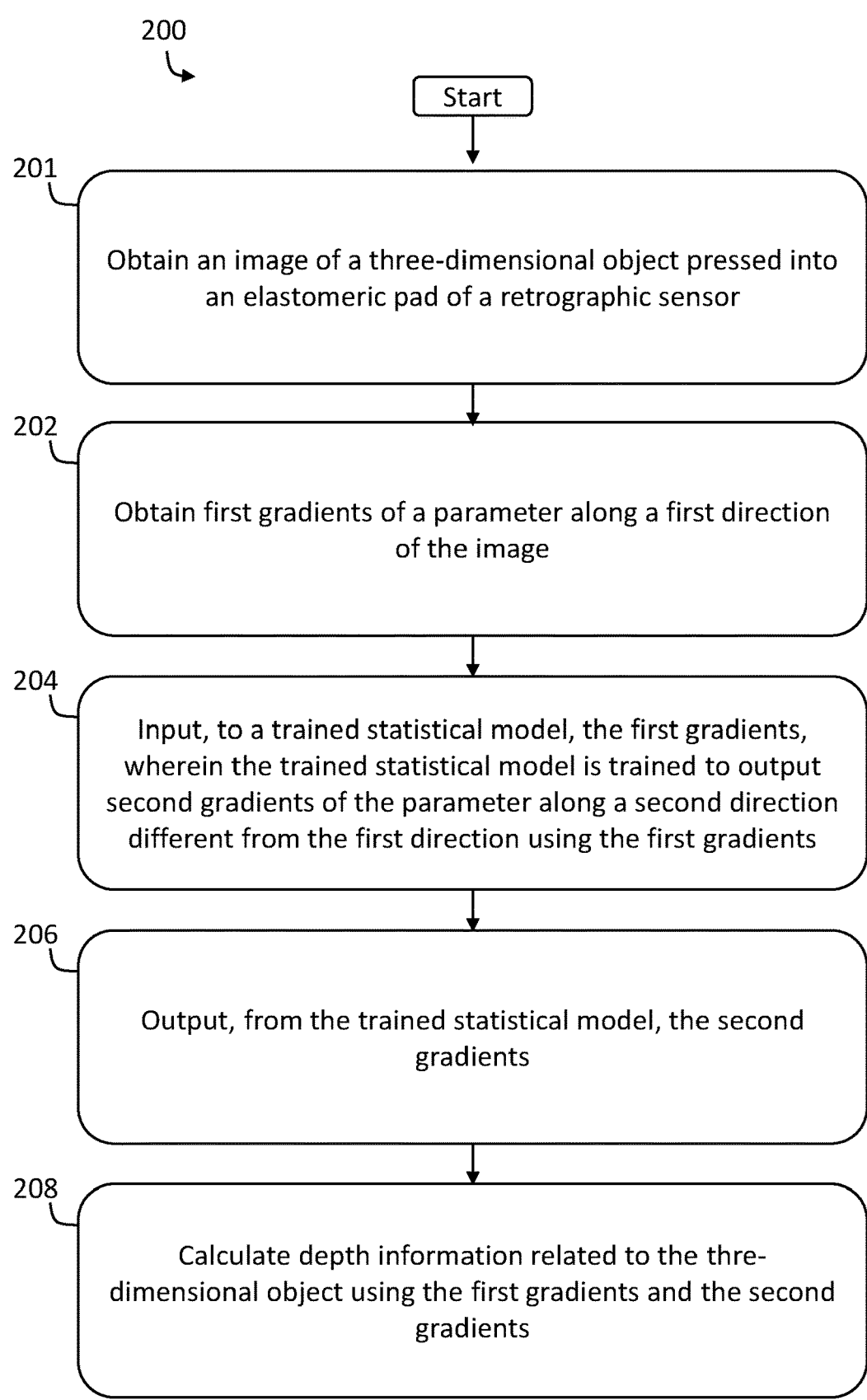

Start

201

Obtain an image of a three-dimensional object pressed into an elastomeric pad of a retrographic sensor

202

Obtain first gradients of a parameter along a first direction of the image

204

Input, to a trained statistical model, the first gradients, wherein the trained statistical model is trained to output second gradients of the parameter along a second direction different from the first direction using the first gradients

206

Output, from the trained statistical model, the second gradients

208

Calculate depth information related to the thre-dimensional object using the first gradients and the second gradients

FIG. 2

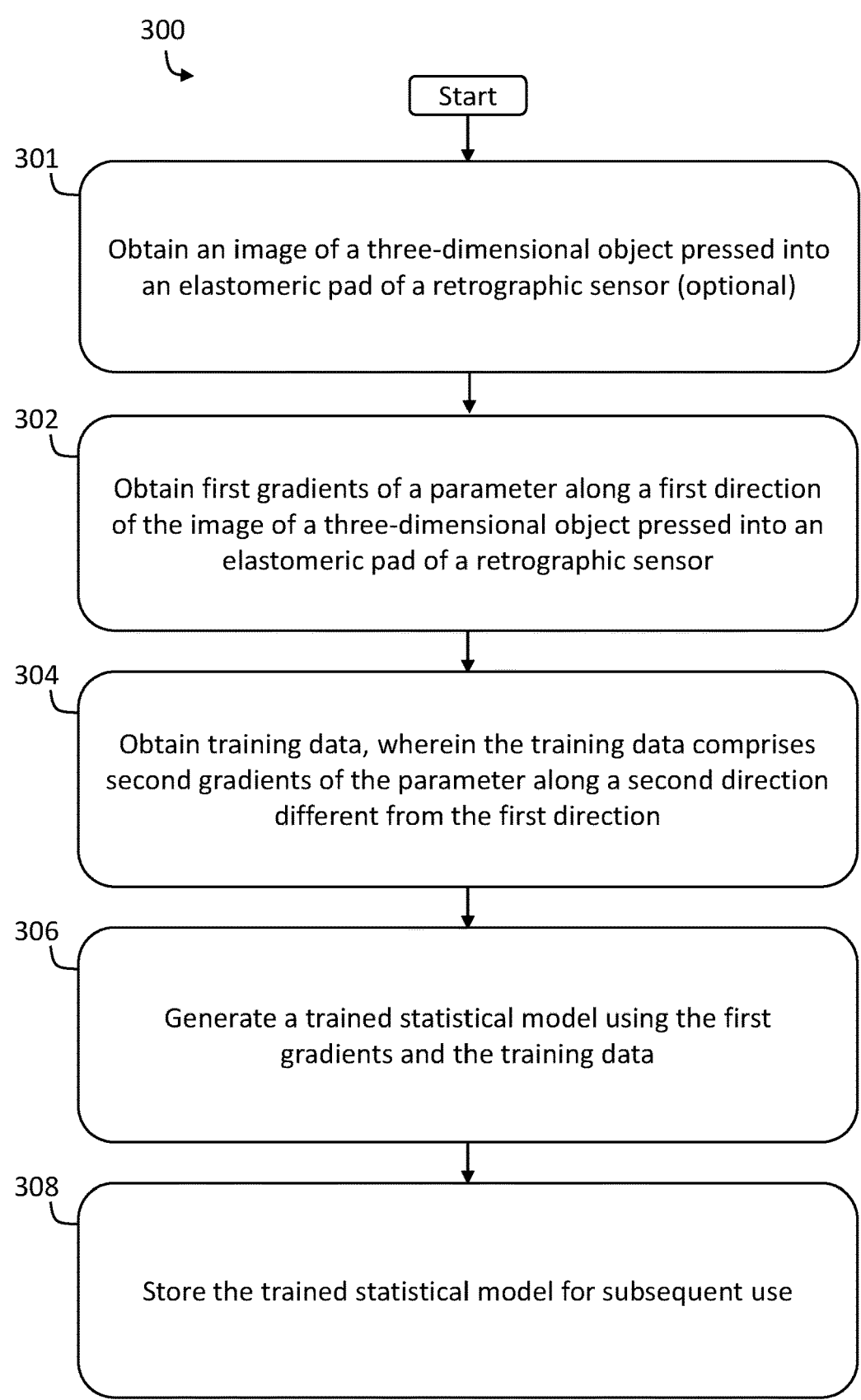

300

Start

301

Obtain an image of a three-dimensional object pressed into an elastomeric pad of a retrographic sensor (optional)

302

Obtain first gradients of a parameter along a first direction of the image of a three-dimensional object pressed into an elastomeric pad of a retrographic sensor

304

Obtain training data, wherein the training data comprises second gradients of the parameter along a second direction different from the first direction

306

Generate a trained statistical model using the first gradients and the training data

308

Store the trained statistical model for subsequent use

FIG. 3

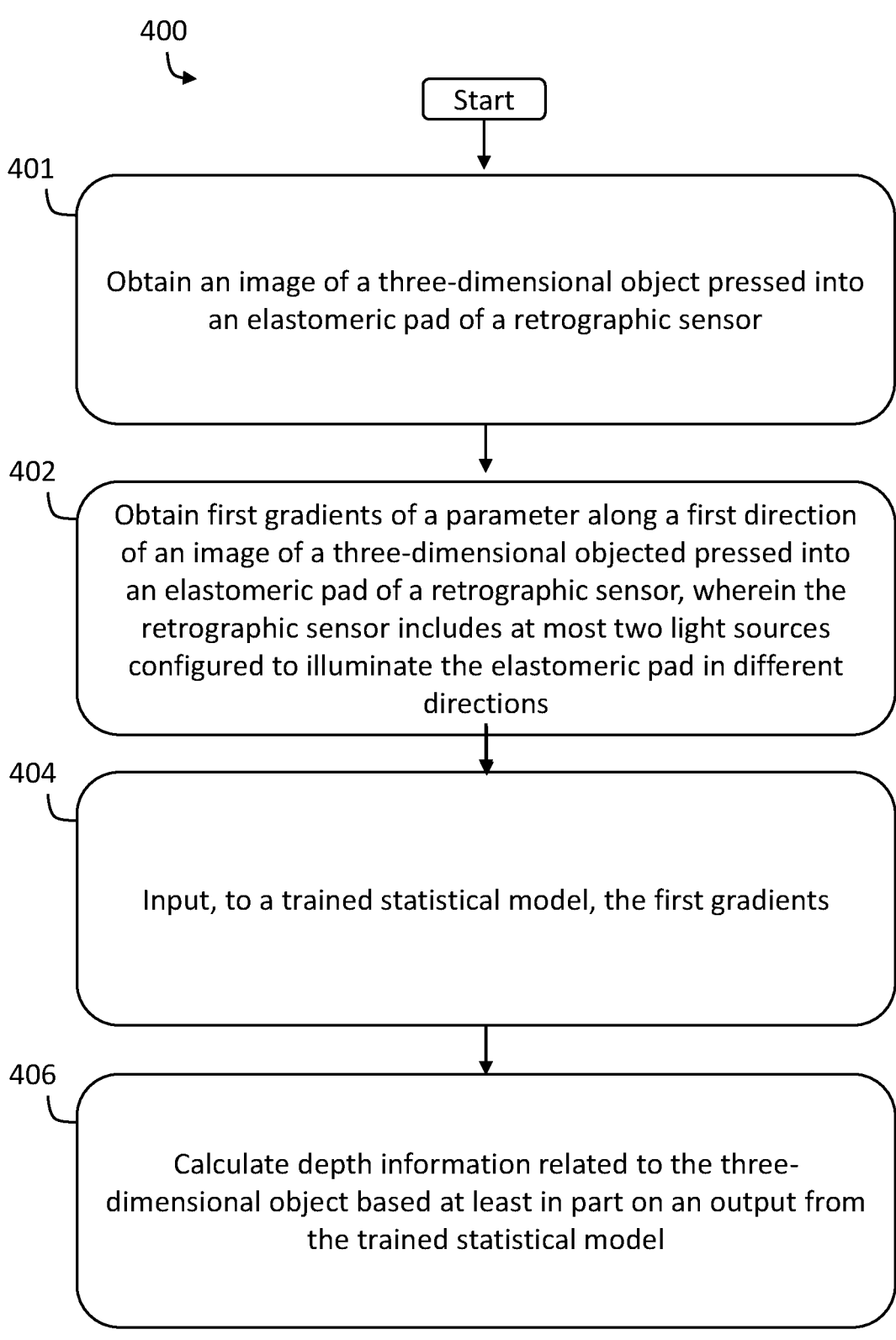

400

Start

401

Obtain an image of a three-dimensional object pressed into an elastomeric pad of a retrographic sensor

402

Obtain first gradients of a parameter along a first direction of an image of a three-dimensional objected pressed into an elastomeric pad of a retrographic sensor, wherein the retrographic sensor includes at most two light sources configured to illuminate the elastomeric pad in different directions

404

Input, to a trained statistical model, the first gradients

406

Calculate depth information related to the three-dimensional object based at least in part on an output from the trained statistical model

FIG. 4

ENHANCED DEPTH ESTIMATION USING DEEP LEARNING

CROSS-REFERENCE TO RELATED APPLICATIONS

This application is a national stage filing under 35 U.S.C. § 371 of international application serial number PCT/US2022/011363, filed Jan. 6, 2022, which claims the benefit under 35 U.S.C. § 119(e) of U.S. provisional application Ser. No. 63/158,327, filed Mar. 8, 2021, the disclosure of each of which is incorporated herein by reference in its entirety.

GOVERNMENT LICENSE RIGHTS

This invention was made with Government support under N00014-18-1-2815 awarded by the Office of Naval Research. The Government has certain rights in the invention.

FIELD

Disclosed embodiments are related to retrographic sensors and related methods of use.

BACKGROUND

The sense of touch contributes to the dexterity of human manipulation, especially in cases where high precision is desirable. The complex ensemble of mechanoreceptors in the human hand provides extremely rich tactile sensory signals. These sensory signals encode information such as contact force and contact shape, and can be used to detect complex state transitions such as making or breaking contact or the occurrence of slippage between the finger and the grasped object.

Vision based tactile sensors have become employed with robotic systems due to their high signal resolutions and the softness of their sensing surfaces. The softness of the sensing surface allows for larger contact regions as it deforms to conform with the object surface. The resulting contact areas are then characterized in great detail via the high resolution signals. Together, these properties have enabled the use of these sensors in tackling several tasks such as assessing grasp success, servoing object surfaces, detecting slip and shear force, reconstructing 3D surfaces, and distinguishing between different cloth materials.

SUMMARY

According to one aspect of the disclosure, there is provided a method comprising, obtaining first gradients of a parameter along a first direction of an image of a three-dimensional object pressed into an elastomeric pad of a retrographic sensor, inputting, to a trained statistical model, the first gradients, wherein the trained statistical model is trained to output second gradients of the parameter along a second direction different from the first direction using the first gradients, and outputting, from the trained statistical model, the second gradients.

In some embodiments, the method further comprises calculating depth information related to the three-dimensional object using the first gradients and the second gradients.

In some embodiments, the retrographic sensor comprises only one light source, the only one light source being a first light source configured to emit light along a first direction.

In some embodiments, the retrographic sensor comprises only two light sources, the only two light sources being a first light source configured to emit light along a first direction and a second light source configured to emit light along a second direction different than the first direction.

In some embodiments, the parameter is an intensity of one or more wavelength bands, the first gradients of the parameter along the first direction comprise derivatives of the intensity of the one or more wavelength bands along the first direction, and the second gradients of the parameter along the second direction comprise estimates of derivatives of the intensity of the one or more wavelength bands along the second direction.

In some embodiments, calculating depth information related to the three-dimensional object using the first gradients and the second gradients comprises applying a Poisson solver to the first gradients the second gradients.

According to one aspect of the disclosure, there is provided a method comprising obtaining first gradients of a parameter along a first direction of an image of a three-dimensional object pressed into an elastomeric pad of a retrographic sensor, obtaining training data, wherein the training data comprises second gradients of the parameter along a second direction different from the first direction, generating a trained statistical model using the first gradients and the training data, and storing the trained statistical model for subsequent use.

In some embodiments, the trained statistical model is a neural network model.

In some embodiments, the parameter is an intensity of one or more wavelength bands.

In some embodiments, the first gradients of the parameter along the first direction comprise derivatives of the intensity of the one or more wavelength bands along the first direction and the second gradients of the parameter along the second direction comprise estimates of derivatives of the intensity of the one or more wavelength bands along the second direction.

According to one aspect of the disclosure, there is provided a retrographic sensor comprising a transparent structure, a transparent elastomeric pad disposed on a surface of the transparent structure, a first light source configured to emit light into the transparent structure along a first direction, at least one computer processor, and at least one non-transitory computer-readable storage medium encoded with a plurality of instructions that, when executed by at least one computer processor, perform a method. The method comprises obtaining first gradients of a parameter along the first direction of an image of a three-dimensional object pressed into the elastomeric pad of the retrographic sensor, inputting, to a trained statistical model, the first gradients, wherein the trained statistical model is trained to output second gradients of the parameter along a second direction different from the first direction using the first gradients, and outputting, from the trained statistical model, the second gradients along the second direction.

In some embodiments, the method further comprises calculating depth information related to the three-dimensional object using the first gradients and the second gradients.

In some embodiments, the retrographic sensor comprises only one light source, the only one light source being the first light source.

In some embodiments, the retrographic sensor comprises only two light sources, the only two light sources being the first light source and a second light source configured to emit light along a second direction different than the first direction.

In some embodiments, the parameter is an intensity of one or more wavelength bands, the first gradients of the parameter along the first direction comprise derivatives of the intensity of the one or more wavelength bands along the first direction, and the second gradients of the parameter along the second direction comprise estimates of derivatives of the intensity of the one or more wavelength bands along the second direction.

In some embodiments, calculating depth information related to the three-dimensional object using the first gradients and the second gradients comprises applying a Poisson solver to the first gradients the second gradients.

In some embodiments, the retrographic sensor further comprises a photosensitive detector configured to provide the image of the three-dimensional object pressed into the elastomeric pad of the retrographic sensor.

According to one aspect of the disclosure, there is provided a method comprising obtaining first gradients of a parameter along a first direction of an image of a three dimensional objected pressed into an elastomeric pad of a retrographic sensor, wherein the retrographic sensor includes at most two light sources configured to illuminate the elastomeric pad in different directions, inputting, to a trained statistical model, the first gradients, and calculating depth information related to the three-dimensional object based at least in part on an output from the trained statistical model.

In some embodiments, the method further comprises outputting, from the trained statistical model, second gradients of the parameter along a second direction different than the first direction.

In some embodiments, the parameter is an intensity of one or more wavelength bands,
   the first gradients of the parameter along the first direction
      comprise derivatives of the intensity of the one or more
      wavelength bands along the first direction, and the
      second gradients of the parameter along the second
      direction comprise estimates of derivatives of the inten-
      sity of the one or more wavelength bands along the
      second direction.

In some embodiments, calculating depth information related to the three-dimensional object using the first gradients comprises applying a Poisson solver to the first gradients.

In some embodiments, the method further comprises obtaining the image of the three dimensional objected pressed into an elastomeric pad of a retrographic sensor, the image including at most two wavelength bands of two respective light sources of the retrographic sensor.

In some embodiments, calculating the depth information includes the trained statistical model outputting the depth information based on the first gradients.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2 is a flow diagram of one embodiment of a method related to determining depth information using a retrographic sensor;

FIG. 3 is a flow diagram of one embodiment of a method related to training a statistical model associated with a retrographic sensor;

FIG. 4 is a flow diagram of one embodiment of a method related to determining depth information using a retrographic sensor;

DETAILED DESCRIPTION

Figure 1:
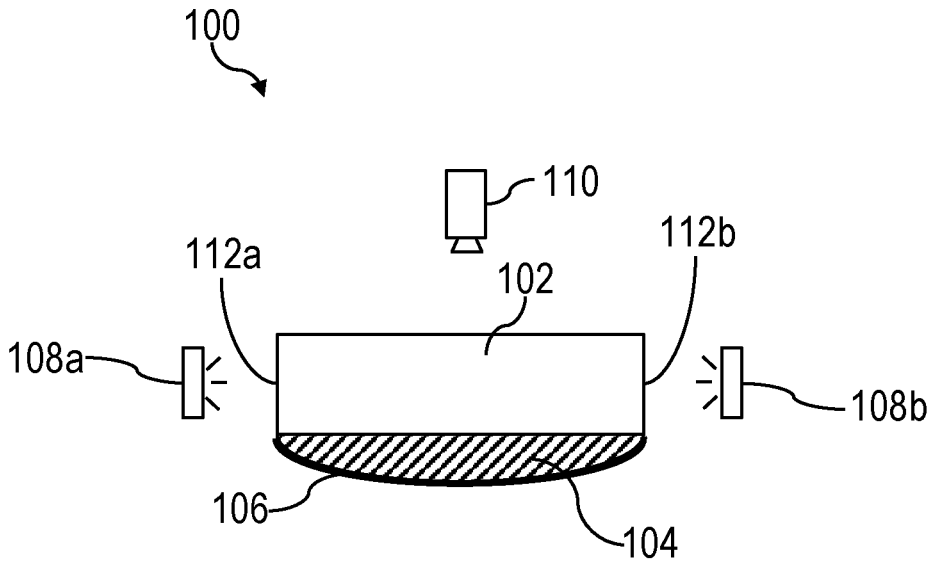
FIG. 1 is a schematic of one embodiment of a retrographic sensor.

During manipulation, robots may occlude an objective from vision, for example, when buttoning a shirt, or tying a shoelace. The occlusion may increase the difficulty for control policies of the robotic system to be implemented with vision alone. Accordingly, in some embodiments, a compact robot finger with tactile sensing to provide high-resolution three-dimensional contact geometry may be used to provide information to a controller of the robotic system. For example, a sensor of the robot finger may be used for pose estimation, material perception, grasp adjustment, contour following, and ball manipulation. Contact geometry and forces may be combined to be applied to slip detection, hardness measurement, cube manipulation, and cable manipulation. Some conventional sensors may provide high-resolution three-dimensional contact geometry. However, conventional sensors may be too bulky for use with robotic fingers. Some conventional sensors may be more compact such that they may be used in robotic applications where more compact sensors may be desirable. However, the Inventors have recognized that these sensors may not be optically designed for high-resolution three-dimensional reconstruction.

The inventors have recognized that it may be beneficial to provide a sensor that meets optical needs for photometric stereo while also meeting mechanical constraints for a compact sensor in applications that are more size sensitive. However, in order to meet the desired size constraints in some applications, it may be desirable to reduce the number of light sources included in a sensor, but this may result less accurate sensing capabilities for typical sensor systems. Accordingly, the inventors have recognized the benefits associated with methods and systems that may be capable of accurately estimating gradients and/or other object based information using reduced information as compared to typical sensors, though instances in which the disclosed methods and systems are used with typical sensors are also contemplated. Mechanically, such a sensor may permit the production of a thin and slim sensor shape similar to human finger capable of sensing and picking up small objects from a surface. However, embodiments in which the methods and/ or systems disclosed herein are used with larger more typical sensors are also contemplated.

Sensors according to various aspects of the disclosure may obtain an image and obtain, from the image, a parameter such as an intensity, or a parameter related to an intensity, of the detected light in one or more wavelength bands. For example, the parameter may comprise intensity, radiance, luminance, or another parameter related to an intensity of the light. Sensors may obtain an intensity, or other related parameter, of the light in a number of wavelength bands corresponding to the different colored lights emitted into the sensor from the one or more light sources of the sensor. As elaborated on further below, a sensor may then calculate gradients comprising derivatives of the parameter along one or more directions.

To provide a smaller sensor, it may be desirable to use a reduced number of light sources in some embodiments of a sensor as compared to typical sensors. For example, two perpendicular light sources, two non-perpendicular light sources, or one light source may be used in a sensor system. However, when fewer light sources are provided, full color gradient information may not be obtained by the sensor which may result in reduced accuracy regarding sensed information about an object in contact with the sensor when using typical control algorithms used with retrographic sensors.

In view of the above, the Inventors have recognized the benefits associated with a sensor system that may be able to either determine the missing gradient information and/or three-dimensional information from an image taken by a retrographic sensor. For example, in some embodiments, a sensor system may determine missing gradients in at least one direction using gradients in a different direction that were obtained from the measured data. In one such embodiment, a trained statistical model such as a neural network, or other appropriate statistical model, may be trained to output the missing gradients in a second direction and/or other appropriate parameters as detailed further below using the gradients in the first direction obtained from the measured data input to the trained statistical model. In some embodiments, these gradients may be intensity gradients of one or more colors (i.e. light with different wavelength ranges emitted by different light sources).

According to aspects of the disclosure, a trained statistical model determines gradients in a second direction using gradients in a first direction. The Inventors have recognized that using a trained statistical model to directly map color images to depth information may require a voluminous amount of training data that is impractical to acquire. However, the Inventors have further recognized that the relationship between two gradients in different directions in a color image may not affected by whether the color image is real or synthesized. Therefore, to train a statistical model to determine a relationship between the two gradients in different directions, synthesized images may be used to train the model in some embodiments. Accordingly, while real images may be used to train a statistical model to determine a relationship between gradients in different directions, this may either be supplemented by, or substituted with synthesized images and training data determined using any appropriate method. Using synthesized images to generate a trained statistical model therefore may greatly reduce the resources used to generate the model and may increase the accuracy of such a model, for example, because additional training data may be used at lesser cost. The resulting trained statistical model may then be used to calculate the desired gradient and/or depth information from analyzed images from a retrographic sensor as described elsewhere herein.

The methods and systems disclosed herein may be used for any desired application. However, in some embodiments, the methods and systems disclosed herein may be provided for measuring high-resolution three-dimensional contact geometry with compact robot fingers. Sensors described herein may also measure high-resolution three-dimensional contact geometry in a compact sensor shape. Sensors described herein may include different light configurations. Providing a sensor with the size of a human finger may allow a robot to work in narrow environments and fine manipulation tasks. The sensors described in the disclosure may be combined with robotic grippers and multi-finger hands to provide more reactive and robust control for various grasping and manipulation tasks. Such sensors may also be used by robots for work in narrow environments, fine manipulation tasks, and/or any other appropriate application as the disclosure is not limited to which applications the disclosed methods and systems are used for.

The sensor systems and methods disclosed herein may offer various benefits. For example, the disclosed sensors may provide contact geometry to localize an objective during visual occlusion and/or when visual systems are not used. The sensors may also measure high-resolution three-dimensional contact geometry for a compact robot finger and simultaneously meet optical and mechanical constraints. Sensors described herein may additionally enable the use compact shapes for robot fingers which may include fewer light sources with less complete information while also achieving high-resolution three-dimensional reconstruction. Thus, it should understood that the sensors and methods described herein may provide three-dimensional reconstruction under different lighting configurations, for example, sensors systems including not more than one light source, not more than two light sources, as well as configurations in which three or more light sources are used are disclosed. The sensors and methods described herein may enable the use of these types of sensors in smaller packages on the order of the size of a human finger for fine manipulation tasks. Some embodiments may also provide reconstructed three-dimensional geometry for pose tracking in the three-dimensional space. Of course, embodiments in which any appropriate combination of the above benefits and/or benefits different from those noted above are provided by a particular sensor system are also contemplated as the disclosure is not limited in this fashion.

According to aspects of the disclosure, sensors described herein may have various arrangements of light sources. In some embodiments, a light source may be arranged in a line along at least a portion of an edge of a transparent structure of the sensor to emit light into the sensor from that edge, though other types of light source arrangements may be used. While light sources may be provided on each edge of a transparent structure of a sensor, in some embodiments, a sensor may have one or more edges that are not illuminated as elaborated on further below. However, sensors having fewer light sources, for example, sensors having one or more edges that are not illuminated may provide non-continuous illumination to a portion of an elastomeric pad where an object is pressed into the pad. A sensor providing non-continuous illumination may also not provide the full gradient information between light sources that sensors having additional lights may provide. In these types of embodiments, the currently disclosed methods and systems may be especially beneficial in their ability to more accurately determine the missing information presented by these types of sensors. However, instances in which the disclosed systems and methods are used with sensors that are fully illuminated from various directions are also contemplated.

In some embodiments, a sensor may have three light sources. A sensor having three light sources may have each of a red light source, a green light source, a blue light source, or light sources of any other appropriate color combination. A sensor having three light sources may have each of its light sources arranged to emit the different colored lights in three different directions into the transparent structure. For example, a sensor may have a rectangular transparent structure three light sources arranged at three different edges of the rectangular transparent structure, such that adjacent light sources are arranged at 90 degrees relative to each other and two of the light sources are arranged on opposing edges of the transparent structure at a relative angle of 180 degrees. Alternatively, three light sources may be arranged at any other appropriate combination of angles relative to each other. In view of the above, in some embodiments, a retrographic sensor may include one or more edges of a transparent structure of the sensor that are not directly coupled with a light source disposed against the corresponding one or more edges.

While three light sources are discussed above, embodiments in which two lights sources, a single light source, and/or any other appropriate number of light sources are used to illuminate a transparent structure of a retrographic sensor are contemplated. Additionally, in instances where multiple light sources are used, these light sources may be oriented at any appropriate angle relative to one another such that the light emitted into the transparent structure of a sensor may initially propagate in different directions relative to each other. It should also be understood that different colored light sources may refer to light sources that emit light with measurably different intensities over one or more wavelength ranges that may be detected by an appropriate optical detector. For instance, a camera may be able to detect the intensities differences of red, green, and blue light at a given pixel location, though any appropriate combination of colors and types of detectors may be used as the disclosure is not so limited.

As used herein, the terms retrographic sensor and vision-based tactile sensors may be used interchangeably. In some embodiments, a retrographic sensor includes a transparent structure including an interior surface, an exterior surface, and one or more side surfaces. The transparent structure may be rigid and may be transparent to one or more wavelength bands of light. In some embodiments, the transparent structure may be formed as a rectangular block (e.g., a rectangular prism). In other embodiments, the transparent structure may be semi-spherical, quarter-spherical, formed as any portion of a sphere or cylinder, or formed as another curved structure (such as an S-shaped structure), though other curved shapes are also contemplated. The retrographic sensor may also include a transparent elastomeric pad disposed on the exterior surface of the transparent structure. The elastomeric pad may be compliant, such that the elastomeric pad deforms when the elastomeric pad contacts an object. The retrographic sensor may also include an at least partially reflective layer disposed on the transparent elastomeric pad such that the transparent elastomeric pad is disposed between the at least partially reflective layer and the transparent structure. Depending on the specific construction the at least partially reflective layer may either be a Lambertian (e.g., matte) material or a semi-specular membrane. The retrographic sensor may also include one or more light sources including, for example, a single light source, two light sources, three light sources, and/or any other appropriate number of light sources that are configured to emit light into one or more edges of the transparent structure. In some instances, the various light sources may emit light with different wavelengths in different directions relative to the transparent structure. In such an arrangement, when the elastomeric pad is deformed, the at least partially reflective layer may also deform causing the light emitted into the structure to scatter and/or reflect in different directions as compared to the undeformed state of the sensor. The sensor may also include an optical detector, such as a camera, that is oriented towards the interior surface of the transparent structure such that optical detector is able to capture images of the deformed elastomeric pad. The captured image(s) may then be used with any of the methods and/or systems disclosed herein.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic of one embodiment of a retrographic sensor. As shown in FIG. 1, retrographic sensor 100 includes a transparent structure 102 and elastomeric pad 104 which are optically joined. The retrographic sensor 100 also includes an at least partially reflective layer 106 disposed on an exterior surface of the elastomeric pad 104. A first light source 108a emits light into a side surface 112a of the transparent structure 102 to illuminate the at least partially reflective layer 106. A second light source 108b emits light into a side surface 112b of the transparent structure 102 to illuminate the at least partially reflective layer 106. An optical detector, such as the depicted camera 110, is oriented towards the elastomeric pad through the transparent structure in order to image deformations of the elastomeric pad when the elastomeric pad is brought into contact with and compressed against an object. A camera, or other photosensitive detetctor, may comprise an array of photosensitive elements disposed behind a lens configured to form an image on the array. Other appropriate types of optical detectors may include, but are not limited to, contact image sensor (CIS) arrays, lenticular arrays, or fiber optic arrays, or any other optical detector which may be configured to form an image on a photosensor array.

First light source 112a and second light source 112b may emit light at different intensities over one or more wavelength ranges. For example, if a red light is employed on one side, a different light color (i.e. a different wavelength range such as blue or green) may be provided on the opposite side, or other side or portion, of the transparent structure. In some embodiments, a red light source may emit light with wavelengths between 635 nm and 700 nm. In some embodiments, a green light source may emit light with wavelengths between 560 nm and 520 nm. In some embodiments, a blue light source may emit light with wavelengths between 490 and 450 nm. Of course, while particular types of light sources and ranges of wavelengths are noted above, it should be understood that any appropriate number of light sources with any appropriate combination of different wavelength ranges may be used as the disclosure is not limited to any specific combination of light sources or wavelength ranges.

During imaging with the retrographic sensor depicted in FIG. 1, or another similar sensor, the image may undergo some preprocessing prior to subsequent use. For example, in some embodiments, a raw imprint imaged with the optical detector is unwrapped to a rectangular shape, then a blank background shape is subtracted from it to get a difference image. Information related to a three-dimensional shape pressed into the elastomeric pad may then calculated by mapping the difference image to surface gradients and applying a fast Poisson solver for integration as elaborated on further below.

According to some embodiments, sensor 100 may further comprise filters, diffusers, or curved elastomeric pads. In some embodiments, a filter comprises a gray filter configured to increase the color contrast and provide better mapping to surface gradients. In some embodiments, a diffuser is configured to remove shadows and provide color gradients on the boundary of a sensor. In some embodiments, a curved elastomeric pad such as a curved gel is configured to provide more uniform global illumination.

A gray filter may be configured to reduce internal reflections. A gray filter may be configured to decrease the contrast of contact regions and the sensitivity for mapping from RGB color to surface gradients when lights reflect inside the transparent structure, such as the acrylic. A gray filter may be configured to absorb light, reducing illumination level and also reducing internal reflections. Internal reflected light may have to pass through the filter twice before returning, while the direct light from the LEDs may have to pass through the filter only once. The gray filter has a greater effect on the internal reflected light, for example, if a gray filter passes ¼ of the light, then the internal reflections will be reduced to ¹⁄₁₆.

A gray filter may be optically coupled to the transparent structure, such as an acrylic block, to reduce or eliminate reflection from an air interface. One manner is to use automobile window tint film, which may include a layer of clear adhesive on one side. The filter may be attached to the acrylic block and pressed in place to reduce or eliminate air bubbles.

A diffuser may be configured to provide more uniform global illumination. Without diffusers, regions on the boundary may not be illuminated. Contact surfaces may lose part of gradient information inside regions that are not illuminated, which may cause errors in three-dimensional reconstruction. Diffusers may spread light smoothly over an entire sensing area.

The sensors disclosed herein, may include any appropriate type of elastomeric pad. For example, in some embodiments, the elastomeric pad may be a clear silicone gel. The elastomer may also be coated with gray or silver paints which may correspond to the above noted at least partially reflective layer. In some configurations, three-dimensional reconstruction may be performed with Lambertian, which may provide more accurate gradient information.

In various embodiments, a shape of an elastomer such as the silicone gel can be flat or curved. Optically, a curved gel may provide more uniform illumination. A curve may cause lights to shift from tilted angles to more direct angles as distance from the light increases. A curved gel may therefore compensate for the decreased LED light intensity over distance. Mechanically, in some embodiments, a flat gel may pick up smaller objects at the tip while curved gel may be more tolerant to flat and concave surfaces, allowing flat and concave surfaces to be sensed without perfect alignment.

In some embodiments, an elastomeric pad of a sensor may be covered by a cover that functions similar to a glove, which may improve the durability of the elastomer, and adjust the friction coefficient of the sensor. In some embodiment, a cover may comprise a fabric. In some embodiments, a cover may comprise a medical tape. Some medical tapes are smooth and sensitive. Compared to fabric, some medical tapes may reserve more contact details. Some medical tape has low friction coefficient, making it less suitable for heavy grasping, but more suitable for sliding motions for inspection or manipulation tasks. Thus, in some embodiments, medial tape, and other lower friction materials, may be suitable for use for facilitating sliding motions for inspection and light-weight manipulation tasks than fabric. In contrast, fabric, and other larger friction materials, may have higher friction forces, and be more rugged, but decrease sensitivity relative to medical tape. Thus, fabric may be more suitable for heavy-weight grasping and manipulation tasks where sensing of fine details is less desirable. In some embodiments, a sensor may automatically switch between two or more different coverings for different tasks, similar to how humans may switch between different gloves.

Components of a sensor shown in FIG. 1, such as the depicted sensor case, camera holder, and mold for curved elastomers, may be three-dimensionally printed with PLA materials. A mold may be polished with sandpapers to be smooth. Transparent structures, such as clear acrylic blocks, mirrors, filters, and diffusers, may be laser cut. An elastomer such as a silicone gel may be attached to a transparent structure such as acrylic with a bonding material. Filters, such as gray filters, and diffusers may be stuck to a side of the transparent structure. The transparent structure may be attached to a sensor case by one or more of press-fitting, fasteners such as pins, or bonding material such as glue. A camera may be press-fit into a camera holder. A camera holder may be attached to a sensor case with fasteners. LEDs may be soldered in arrays and attached to sides of the sensor case, for example, using tape. A front-surface mirror may be attached inside a sensor case, for example, using glue, and may be disposed tilted 30 degrees. Of course, while particular materials and manufacturing methods are noted above, any appropriate type of material and/or construction may be used for a sensor as the disclosure is not so limited.

In some embodiments, a sensor covering may comprise markers, for example, black dots. In some embodiments, markers may be reduced in size, or black dots may be changed to a checkerboard pattern including lighter colors, for example, lighter and darker gray.

FIG. 2 shows a process flow 200 of one embodiment of a method related to determining depth information using an image from a retrographic sensor. The process flow 200 may be performed by at least one computer processor which may either be incorporated with the sensor and/or may be on a separate system. In some embodiments, there may be at least one non-transitory computer-readable storage medium encoded with a plurality of instructions that, when executed by at least one computer processor, perform process flow 200. Process flow 200 comprises step 201, step 202, step 204, step 206, and step 208. In step 201, the at least one computer processor obtains an image of a three-dimensional object pressed into an elastomeric pad of a retrographic sensor. This may either be done in real time where an image captured by a retrographic sensor, such as the retrographic sensor depicted above, is transmitted to the at least one processor or the image may have been taken previously and the at least one processor is used to process the image at any desired time point after being taken. As noted previously, the image may have been taken using a retrographic sensor that illuminates the deformed surface of the elastomeric pad with one or more light sources. In some embodiments, the light sources may not provide a continuous mapping of color gradients around the entirety of the deformed portion of the elastomeric pad. For example, the pad may be only illuminated from one direction, two directions, or any other appropriate number of directions. In step 202, the at least one computer processor obtains first gradients of a parameter along a first direction of an image of a three-dimensional object pressed into an elastomeric pad of a retrographic sensor. In some embodiments, the sensor may obtain a color image of a three-dimensional object in contact with the sensor. From the color image, information representing intensity of the one or more colors present in the image, where the colors may correspond to one or more wavelength bands of light, may be separately detected by an associated optical detector. For example, red, green, blue, and/or other appropriate type and/or numbers of colors (or fewer colors for sensors having only one or two light sources) may be detected. Position information associated with the different pixel locations, such as an X and Y coordinate, may also be obtained. The color intensity information and positions obtained from the color image may be used to determine the gradients of the colors mapped to gradients using a trained statistical mode or a lookup table. For example, the gradients may represent derivatives of the color intensity information. In an optional step, prior to obtaining the image, the sensor may be calibrated to determine pixels per distance and pixel positions. In step 204, the at least one computer processor inputs, to a trained statistical model, the first gradients, wherein the trained statistical model is trained to output second gradients of the parameter along a second direction different from the first direction using the first gradients. In step 206, the at least one computer processor outputs, from the trained statistical model, the second gradients. In step 208, the at least one computer processor calculates depth information related to the three-dimensional object using the first gradients and the second gradients. In some embodiments, the first gradients and second gradients are input to a solver implemented on the processor. For example, a fast Poisson solver along with one or more appropriate boundary conditions may be used where the fast Poisson solver outputs the desired depth information. In some embodiments, a three-dimensional shape may be calculated from the gradients in another manner. For example, a three-dimensional shape may be calculated from the gradients by solving Poisson's equations in another manner. In some embodiments, the three-dimensional shape may be calculated from the gradients using a Fourier transform such as a fast Fourier transform. In other embodiments, the three-dimensional shape may be calculated from the gradients by solving a set of linear equation. In further still embodiments, the three-dimensional shape may be calculated from the gradients using a trained statistical model, such as a neural network, that is trained to output three-dimensional shapes using gradients as input.

FIG. 3 shows a process flow 300 of one embodiment of a method related to training a statistical model associated with a retrographic sensor. The process flow 300 may be performed by at least one computer processor. In some embodiments, there may be at least one non-transitory computer-readable storage medium encoded with a plurality of instructions that, when executed by at least one computer processor, perform process flow 300. Process flow 300 comprises step 302, step 304, step 306, and step 308. In step 302, the at least one computer obtains first gradients of a parameter along a first direction of an image of a three-dimensional object pressed into an elastomeric pad of a retrographic sensor. In step 304, the at least one computer processor obtains training data, wherein the training data comprises second gradients of the parameter along a second direction different from the first direction. In step 306, the at least one computer processor generates a trained statistical model using the first gradients and the training data. In step 308, the at least one computer processor stores the trained statistical model for subsequent use. In an optional step, after the at least one computer processor has generated the trained statistical model, the at least once trained statistical mode may input first gradients into the at least one statistical model to obtain second gradients and the first and second gradients may be used to obtain depth information for a three-dimensional object in contact with a sensor.

The parameter of the image may be an intensity, or other related parameter, of light in one or more wavelength bands. In some embodiments, the first gradients comprise derivatives of the parameter. This may correspond to a derivative of the intensity of the light, or other parameter related to the intensity of the light, in the one or more wavelength bands along a first direction. The second gradients may comprise derivatives of the parameter, e.g. a derivative of the intensity, of the light in the one or more wavelength bands along a second direction. In some embodiments, the first direction is perpendicular to the second direction, though other arrangements may also be used as detailed herein. The number of wavelength bands may correspond to the number of light sources of the sensor. Each wavelength band of the one or more wavelength bands may correspond to a wavelength band of a light source of the retrographic sensor which may either be non-overlapping or partially overlapping depending on the embodiment.

In an optional step, the at least one computer processor obtains the first gradients and the second gradients from at least one image. In some embodiments, the at least one image may comprise a real image taken by a camera of a sensor, where the real image shows a three-dimensional object pressed into an elastomeric pad of the sensor. For example, an object having a known size and shape may be depressed into a pad of the sensor at a known orientation and an image of the deformation of the sensor pad may be imaged by the sensor camera. Pressing objects into the sensor pad may be repeated using different orientations of the same object, using a number of different objects, or using a combination of both methods, until set of training images are obtained. After the real images are obtained, gradients in the two different directions, for example, two perpendicular directions, may be obtained from each image and used to train the statistical model, with gradients in one direction comprising the desired input of the model and gradients in the other direction comprising the desired output of the model.

In some embodiments, the at least one image may comprise a synthesized image generated by the at least one computer processor. For example, the at least one computer processor may generate random surfaces to produce the synthesized images. Boundaries of the random surfaces may be flattened, and negative depths may be removed to provide data that is similar to real data that would be obtained by pressing objects into a pad of a sensor. Details in the random surfaces may also be generated. For details, random arrays ranging from −1 to 1 and cubes of the values for magnification may be generated, boundaries may be set to zeros, Gaussian filters with random kernel sizes may be applied, negative depth may be clipped, and maximal height may be randomly scaled within the range of deformations of the pads of real sensors. To avoid artifacts like small bumps between contact regions and the boundary, boundaries may be set to zeros to match real sensor data and provide constraints. After the random surfaces are generated, color images may be determined based on the random surfaces to produce synthesized images. However, random surfaces or synthesized images may be generated in any suitable manner. The number and orientation of colors may be selected according to the number and orientation of the light sources that are included in a corresponding sensor that the trained statistical model is being generated for. After the synthesized images are obtained, gradients in the two different directions, for example, two perpendicular directions, may be obtained from each image and used to train the statistical model, with gradients in one direction comprising the desired input of the model and gradients in the other direction comprising the desired output of the model. Generating synthesized images may require reduced time and resources compared to obtaining real images, particularly when a large number of images is required.

Once a trained statistical model has been generated, the trained statistical model may be stored for subsequent use. For example, the trained statistical model may be stored on at least one non-transitory computer readable storage medium. The stored model may then be used for a number of different applications related to determining gradients in a first direction using gradients in second direction different than the first direction. The determined gradients may then be used to determine depth information for an associated image. Alternatively, embodiments in which the trained statistical model is used for determining the depth information directly from a first grading determined from a corresponding image may also be used.

Training data may be provided to a machine learning module. Specifically, the gradients Gx and Gy obtained from the synthesized images may be obtained and provided to a machine learning module. For example, the gradients may correspond to intensity gradients of one or more light colors or other parameter associated with the image. This training data may be obtained in any appropriate fashion using prior experiments and/or calculations. Due to the computationally expensive process of calculating this training data, the training data may be limited to a predetermined number of data points. For example, the training data may be limited to approximately 10,000 synthesized images, though any appropriate number of training data points including numbers both greater than and less than that noted above may also be used. Regardless of the specific number, training data points may be randomly selected throughout a range of depths or gradients and/or any other appropriate disposition as the disclosure is not limited in this fashion. Additionally, in some embodiments, the provided data may be segmented into training data and verification data where the training data may be used with the noted machine learning module and the verification data may be input into the trained statistical model for determining the accuracy of the resulting model.

In one embodiment, the gradient Gx and Gy training data are input into a statistical model in a machine learning module. Once these inputs have been received, the machine learning module may generate a trained statistical model using the gradient Gx and Gy training data. The resulting output from the machine learning module may correspond to a gradient model, which is a trained statistical model of a missing one of the gradients (for example, Gx) which may be a function of a gradient for which there is real data (for example, Gy). The trained statistical model may also be stored in an appropriate non-transitory computer readable medium for subsequent use as detailed further below.

It should be understood that the trained statistical models disclosed herein may be generated using any appropriate statistical model. For example, a machine learning modules, may correspond to any appropriate fitting method capable of generating the desired trained statistical models including, but are not limited to, artificial neural networks (ANN), gradient boosting regression (GBR), random forest regression (RFR), other kernel-based fitting methods, Lagrange polynomial fitting, and/or any other appropriate type of fitting method.

It should also be understood that the above noted fitting methods may be combined with any appropriate type of fitting approximation to provide a desired combination of model accuracy versus computational expense. For example, appropriate approximation methods that may be used include, but are not limited to, GW theory, HSE06, generalized gradient approximation, local density approximation, meta-GGA, combinations of the forgoing, and/or any other appropriate type of approximation as the disclosure is not limited in this fashion. Additionally, iterative training processes may also be used. I Of course, it should be understood that any appropriate combination of fitting approximations with the disclosed statistical models may be used as the disclosure is not limited to only the specifically disclosed combination.

FIG. 4 shows a process flow 400 of one embodiment of a method related to determining depth information using a retrographic sensor. The process flow 400 may be performed by at least one computer processor. In some embodiments, there may be at least one non-transitory computer-readable storage medium encoded with a plurality of instructions that, when executed by at least one computer processor, perform process flow 400. Process flow 400 comprises step 402, step 404, and step 406. In step 402, the at least one computer obtains first gradients of a parameter along a first direction of an image of a three dimensional objected pressed into an elastomeric pad of a retrographic sensor, wherein the retrographic sensor includes at most two light sources configured to illuminate the elastomeric pad in different directions In some embodiments, the sensor may obtain a color image of a three-dimensional object in contact with the sensor. From the color image, information representing intensity of some of colors R, G, B (depending on which color light sources included in the sensor) and position X, Y may be obtained. The color intensity and positions obtained from the color image may be mapped to gradients using a trained statistical mode or a lookup table. In an optional step, prior to obtaining the image, the sensor may be calibrated to determine pixels per distance and pixel positions. In step 404, the at least one computer processor inputs, to a trained statistical model, the first gradients. In step 406, the at least one computer processor calculates depth information related to the three-dimensional object based at least in part on an output from the trained statistical model. In some embodiments, the first gradients and second gradients are input to fast Poisson solver along with boundary condition and fast Poisson solver outputs the depth information.

Figure 5A:
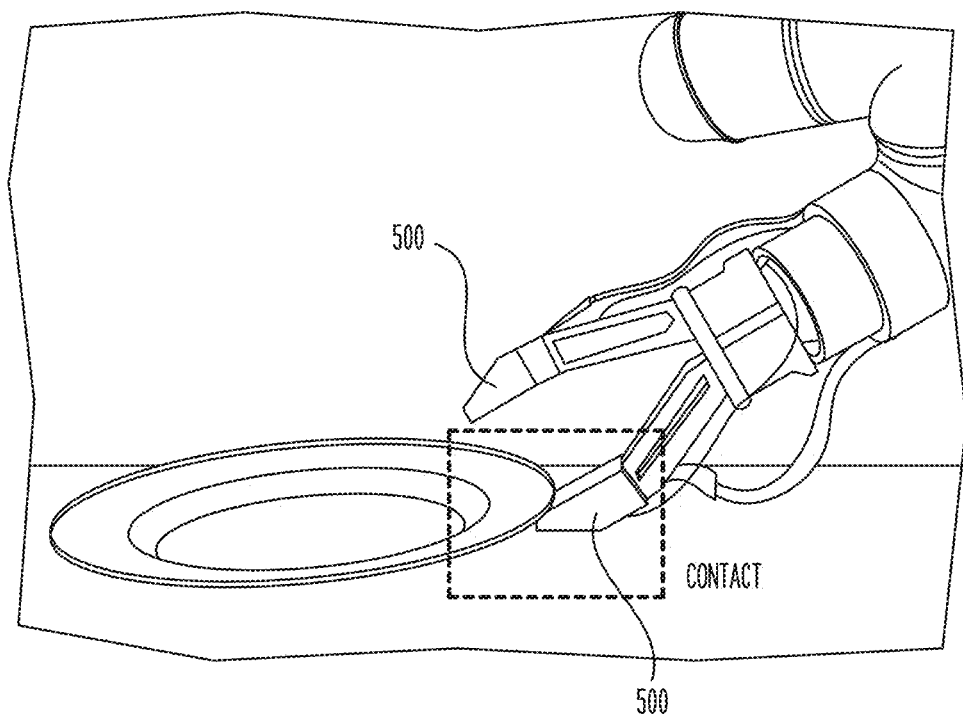
FIG. 5A shows a photograph of one embodiment of a retrographic sensor.
Figure 5B:
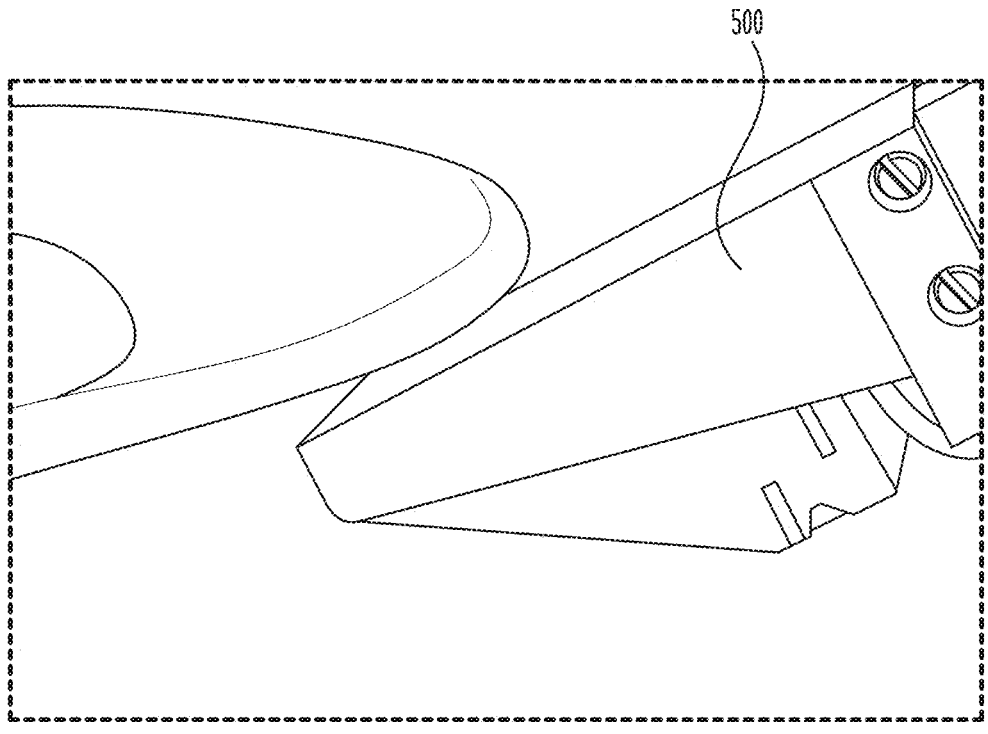
FIG. 5B shows a photograph of one embodiment of a retrographic sensor.

FIGS. 5A-5B show one embodiment of a retrographic sensor 500 incorporated into a robotic system. FIG. 5A shows a gripper equipped with two retrographic sensors 500 making contact with a plate on a table. FIG. 5B shows a close-up view of a bottom retrographic sensor 500 positioned in a gap between the plate and the table with the retrographic sensor in contact with a bottom edge of the plate.

Aspects of the disclosure may be related to the design and fabrication of sensors. For example, in some embodiments, the sensors disclosed herein may have a compact shape for robotic tasks, while maintaining high-resolution three-dimensional reconstruction. In some embodiments, there may be some compromise of optical properties for better shape. FIGS. 6A-6D show components and schematics of a retrographic sensor 500 according to some embodiments.

Example: Construction of a Retrographic Sensor and Testing Methods

Figures 6A, 6B, 6C, 6D:
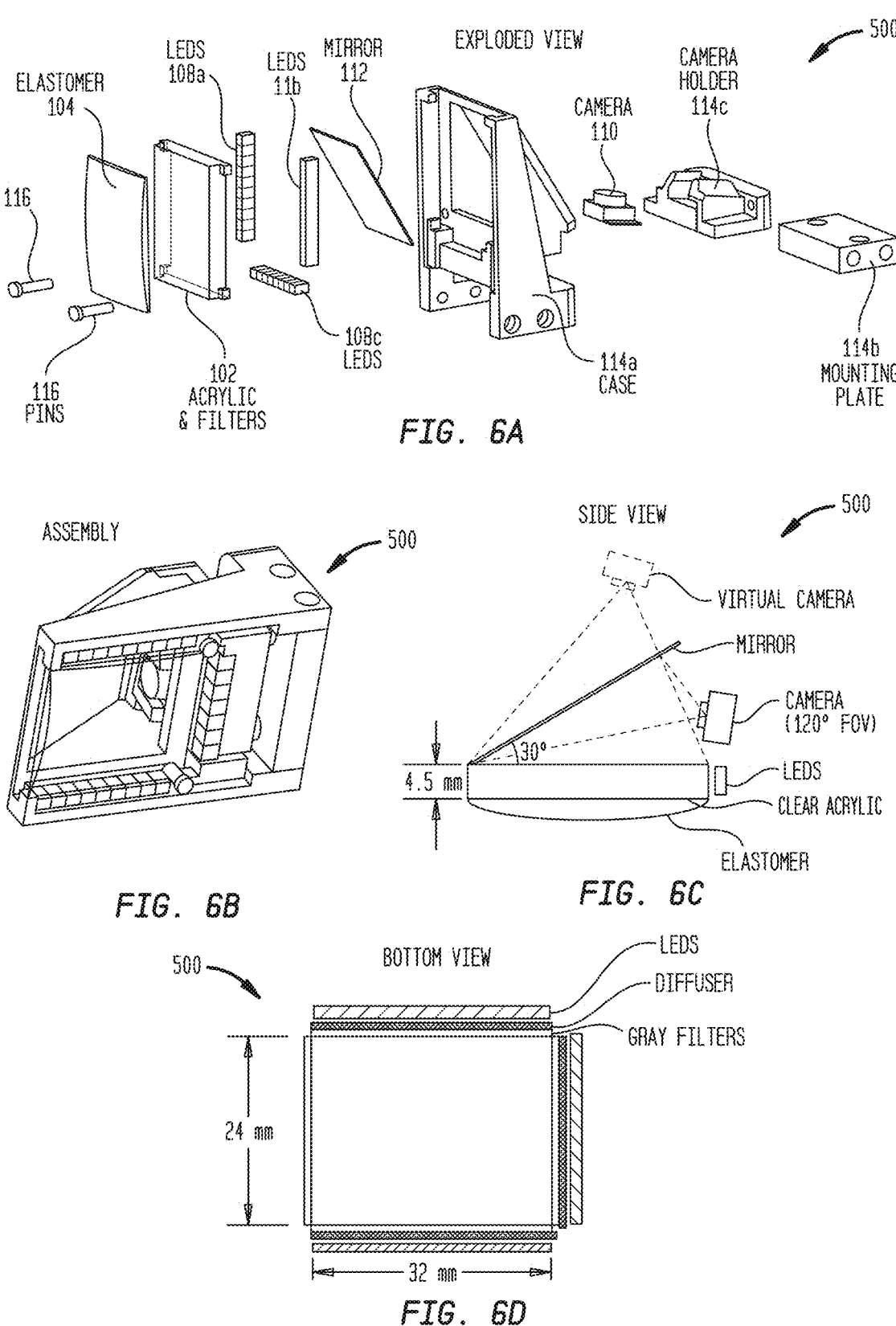
FIG. 6A shows an exploded perspective view of one embodiment of a retrographic sensor.
FIG. 6B shows a perspective view of one embodiment of a retrographic sensor.
FIG. 6C shows a side view of one embodiment of a retrographic sensor.
FIG. 6D shows a plan view of one embodiment of a retrographic sensor.

One embodiment of a compact sensor for sensing applications and implementation of the disclosed methods is depicted in FIG. 6A. A similar sensor was build and used to experimentally validate the currently disclosed methods and systems. In the depicted embodiment, a retrographic sensor 500 comprises a transparent structure 102, an elastomeric pad 104 disposed on the transparent structure, first light source 108a oriented to emit light into a first side of the transparent structure, second light source 108b oriented to emit light into a second side of the transparent structure, third light source 108c oriented to emit light into a third side of the transparent structure, and camera 110 that is positioned and arranged to image the elastomeric pad through the transparent structure. For testing purposes, the transparent structure 102 included an acrylic block and filters. The elastomeric pad 104 comprised a gel. The first light 108a was a blue light, the second light 108b was a red light, and the third light 108c was a green light. Of course, various embodiments with different arrangements may also be used.

The Retrographic sensor 500 further comprised a mirror 110 configured to provide a more compact position for the virtual camera shown in FIG. 6C where the camera is optically coupled to the surface of the elastomeric pad via reflection from the mirror. The retrographic sensor 500 further comprised several housing components configured to hold the other components. In the depicted embodiment, the housing included: a case 114a configured to retain the transparent structure 102, elastomeric pad 104, lights 108a-108c, camera 110, and mirror 112; a mounting plate 114b configured to mount the sensor on a robotic system; a camera holder 114c configured to mount and retain the camera in the case; and pins 116, or other appropriate fastener, for connecting the various components of the sensor to one another.

In the exemplary sensor, the lighting was provided by the three linear light sources 108a-108c which were oriented to illuminate the transparent structure from three separate sides of the rectangular structure oriented at 0 degrees, 90 degrees, and 180 degrees. However, as noted above, different numbers and arrangements of the lights could have been used. In either case, the depicted arrangements provide three directional color lights which may not evenly illuminate every portion of a three dimensional object pressed into the sensor due to the arrangement of the light sources. In the depicted sensor, the light sources were lensless LED arrays (3.5×2.8 mm) which were disposed directly on the three sides of the transparent structure to provide the desired directional light into the transparent structure. This helped to provide a thin sensor.

By omitting a light source that may have been placed at a tip of the sensor may provide a more compact tip better able to pick up small objects. However, as noted above, omission of this light source at the tip results in the sensor only being illuminated in three directions which may result in a reduction of horizontal gradients which may be obtained from the sensor, for example, half of the horizontal gradients, as discussed herein.

According to some embodiments, different filters, diffusers, and curved gels may be incorporated in a sensor. Some filters may comprise gray filters. Dark filters increase the color contrast and may provide better mapping to surface gradients. Diffusers may remove shadows and provide color gradients on the boundary. Curved gels may produce more uniform global illumination. Using gray filters and diffusers can increase the contrast and uniformity of tactile imprints.

Gray filters can reduce internal reflections. When lights reflect inside the transparent structure, such as the acrylic, the gray filter may decrease the contrast of contact regions and the sensitivity for mapping from RGB color intensity information to surface gradients. A gray filter may absorb light, reducing illumination level and also reducing internal reflections. Internal reflected light may have to pass through the filter twice before returning, while the direct light from the LEDs may have to pass through the filter only once. The gray filter has a greater effect on the internal reflected light, for example, if a gray filter passes ¼ of the light, then the internal reflections will be reduced to ¹⁄₁₆.

A gray filter may be optically coupled to the acrylic block to reduce or eliminate reflection from an air interface. One manner is to use automobile window tint film, which may include a layer of clear adhesive on one side. The filter may be attached to the acrylic block and pressed in place to reduce or eliminate no air bubbles. In some embodiments, a filter may comprise a brand called "VViViD Air-Tint Dark Air-Release Vinyl Wrap Film."

A diffuser can lead to more uniform global illumination. Without diffusers, regions on the boundary may not be illuminated. Contact surfaces may lose part of gradient information inside regions that are not illuminated, which may cause errors in three-dimensional reconstruction. Diffusers may spread light smoothly over an entire sensing area. In some embodiments, a diffuser may comprise "3M Diffuser 3635-70" for the sensor.

A sensor may comprise a camera. The camera may be configured to obtain an image of an objective of the sensor. In some embodiments, a camera may comprise a Raspberry Pi mini camera, which may have a high field of view of 120 degrees. Using a small camera may provide a more compact sensor. Information obtained from a camera, for example, video, may be streamed via mjpg_streamer on a Raspberry Pi. The camera information such as mjpeg video stream may be parsed using Python executed on a computer processor. In some embodiments, camera information may be provided at 60 FPS for 640×480 pixels, or 90 FPS for 320×240 pixels. In some embodiments, mjpg_streamer settings can cause flickering images. In some embodiments, AWB (auto white balance) may be turned off, and fixed gains for awbgainR (red channel), awbgainB (blue channel), and EV (exposure compensation for RGB channels) may be tuned.

A sensor may comprise an elastomer such as a clear silicone gel. The elastomer can be coated with gray (for example, Lambertian) or silver (for example, Semi-specular) paints. In some configurations, three-dimensional reconstruction may be performed with Lambertian, which may provide more accurate gradient information. In some embodiments, clear silicone may comprise "Silicone Inc. XP-565." In some embodiments, paints may comprise "Print-On Silicone Ink" paints.

In various embodiments, a shape of an elastomer such as the silicone gel can be flat or curved. Optically, a curved gel may provide more uniform illumination. A curve may make lights shoot from tilted angles to more direct angles as distance from the light increases. A curved gel may therefore compensate for the decreased LED light intensity over distance. Mechanically, in some embodiments, flat gel may pick up smaller objects at the tip while curved gel may be more tolerant to flat and concave surface, allowing flat and concave surfaces to be sensed without perfect alignment.

A sensor may comprise a covering. In some embodiments, the covering may comprise a medical tape. A medical tape cover may reserve more details, have lower friction forces, and provide protection for the elastomer. Medial tape may be more suitable for sliding motions for inspection and light-weight manipulation tasks than fabric. Fabric may have higher friction forces, and be more rugged, but decrease sensitivity relative to medical tape. Fabric may be more suitable for heavy-weight grasping and manipulation tasks that do not require fine details. In some embodiments, a sensor may automatically switch between two or more different coverings for different tasks, similar to how humans may switch between different gloves.

In some embodiments, the elastomer, such as a gel, of a sensor may be covered by a cover that functions similar to a glove, which may improve the durability of the elastomer, and adjust the friction coefficient of the sensor. In some embodiment, a cover may comprise a fabric. In some embodiments, a cover may comprise a medical tape. Some medical tapes are smooth and sensitive. Compared to fabric, some medical tapes may reserve more contact details. Some medical tape has low friction coefficient, making it not suitable for heavy grasp, but suitable for sliding motions for inspection or manipulation tasks. Medical tapes may provide medium-level protection compared to fabric. In some embodiments, a medical tape may comprise a "3M Tagaderm" medical tape.

Components of a sensor, such as a sensor case, camera holder, and mold for curved elastomers, may be three-dimensionally printed with PLA materials. A mold may be polished with sandpapers to be smooth. Transparent structures, such as clear acrylic blocks, mirrors, filters, and diffusers, may be laser cut. An elastomer such as a silicone gel may be attached to a transparent structure such as acrylic with a bonding material such as Silpoxy or A-564 Medical Silicone Adhesive. Filters, such as gray filters, and diffusers may be stuck to a side of the transparent structure. The transparent structure may be attached to a sensor case by one or more of press-fitting, fasteners such as pins, or bonding material such as glue. A camera may be press-fit into a camera holder. A camera holder may be attached to a sensor case with fasteners such as M2 screws. LEDs may be soldered in arrays and attached to sides of the sensor case, for example, using tape. A front-surface mirror may be attached inside a sensor case, for example, using glue, and may be disposed tilted 30 degrees. In some embodiments, a CSI-to-HDMI connector may be used instead of camera ribbons by HDMI cables, which may increase the robustness of a sensor. 3.3V from the connector may be used to supply the LEDs with power. An external printed circuit board may connect resistors to the LEDs, which may reduce size of the sensor.

Three-dimensional reconstruction results may be influenced by disturbances. In some embodiments, a disturbance may comprise sensor markers. Without extra processing, markers may result in small bumps in three-dimensional reconstruction. The bumps may be reduced by filing zeros gradients to the marker mask, which may remove bumps and run fast, but generates flat patches. Performance may be improved by interpolating gradients for markers. In some embodiments, griddata in the scipy package may be used for interpolation. In some embodiments, interpolation may be run in real time, using the nearest method, only sampling pixels around the markers, which may require only 10 ms for resolution of 200×150, allowing real-time feedback control. In contrast, a linear/cubic interpolation may generate better results but take 60/70 ms.

The influence of markers on three-dimensional reconstruction may be reduced. For example, the size of markers may be reduced, or black dots may be changed to a checkerboard pattern including lighter colors, for example, lighter and darker gray.

In some embodiments, a disturbance may comprise elastomer deformation and shadows Elastomer deformation and shadows can influence three-dimensional reconstruction, for example, for sharp surfaces. Elastomer deformation may increase the difficulty of extracting the surface of an object from reconstructed three-dimensional shape and also make signals force-dependent.

A reconstructed three-dimensional point cloud may be used with Iterative Closest Point for pose tracking. For example, the pose of a cube may be tracked when its corner is pressed into a sensor. Sensors described herein may be used to track the poses of objects such as a cube, with various orientations. An initial pose may be given, and the Iterative Closest Point algorithm from Open3D may be used to track the pose. Iterative Closest Point runs at about 10 Hz.

Example: Generation and Testing of a Trained
Neural Network for Three Dimensional Sensing According to one example, three-dimensional reconstruction was applied to images taken with a sensor similar to that described above using a three light arrangement. The three-dimensional reconstruction consisted of two steps: first calculating a mapping from color intensity information (RGB) to horizontal and vertical surface gradients (Gx, Gy) and second applying fast Poisson solver to integrate the gradients and obtain depth information.

To obtain data for color intensity-to-gradient mapping, a calibration ball, with a known radius (for example, 2.4 mm) was pressed on the elastomer of sensor. Then, the center and the radius of the contact circle were calculated in pixels using a Hough Circle Transform and human adjustment. Then, a caliper was pressed on the elastomer of the sensor to calculate the number of pixels per millimeter. Using the center and radius of the contact circle, and pixels per distance as parameters, the gradient Gx, Gy for each pixel in contact was calculated, and the pixel's color intensity and position: R, G, B, X, Y was gathered. The position, XY, can be used to evaluate global color changes across the sensor.

Color intensity (RGBXY) was mapped to gradient (Gx, Gy) using a trained statistical model. A lookup table was used to map color intensity to gradient. A trained statistical model, a small neural network, which was a multi-layer perceptron (MLP) with 3 hidden layers (e.g., 5-32-32-32-2) was used to map color intensity to gradient. A trained statistical model provided improved performance compared to a lookup table because the lookup table may require discretization for speed-up and may be difficult to incorporate position. In contrast, a small neural network produced continuous results and considered color changes across a sensor. To generate the trained statistical model, 32 images were collected for training, and 8 images were collected for testing. Besides the pixels in contact, 5% of pixels not in contact were added to balance the data.

Three-dimensional reconstruction was performed with fast Poisson solver. After obtaining the gradients Gx, Gy, a 2D fast Poisson solver Python version, was used to calculate depth information. Fast Poisson solver takes in gradients Gx, Gy, and boundary conditions as inputs and returns the depth information as an output. Boundaries were set as zeros.

Three-dimensional reconstruction was performed with different light configurations. In the example the sensor comprised perpendicular lights. The inventors recognized that perpendicular lights may simplify three-dimensional reconstruction. Because perpendicular lights provide gradients for both axes, fast Poisson solver may be used directly. In some embodiments, a sensor comprises only two lights, and may be provided with angles of 60, 90, 120, or 180 degrees. Lights with angles of 60, 90, or 120 degrees may provide improved performance compared to lights with angles 180 degrees.

In one example, a sensor may comprise two perpendicular RG lights. Sensors may comprise two perpendicular lights of other color combinations. Fast Poisson solver may be used directly with two perpendicular lights. Depth information for the two perpendicular lights may provide similar depth information as three RGB lights.

Three-dimensional reconstruction may be performed with only one light or only two lights. In some sensor embodiments, there may not be space to place three lights on a sensor. For example, some sensors may have one axis that is too long and deformable for directional light to travel.

For three-dimensional reconstruction algorithms, sensors may use a photometric stereo technique. The photometric technique maps color intensity to surface gradients with a lookup table and integrates the gradients with a fast Poisson solver to obtain depth information. Color mapping may require distinguishable color signals for different surface gradients and the fast Poisson solver may require surface gradients in two different directions, for example, perpendicular directions such as both horizontal and vertical directions.

Some sensors may not meet the requirements of distinguishable color signals for different surface gradients or surface gradients in two different directions, for example, because they lack enough light sources. In some embodiments, a trained statistical model such as a neural network may be used to provide three-dimensional reconstruction. The inventors have recognized that reconstructing three-dimensional information from raw images is complex and therefore may require thousands of calibration images to learn a model that can generalize to different shapes.

Figure 7:
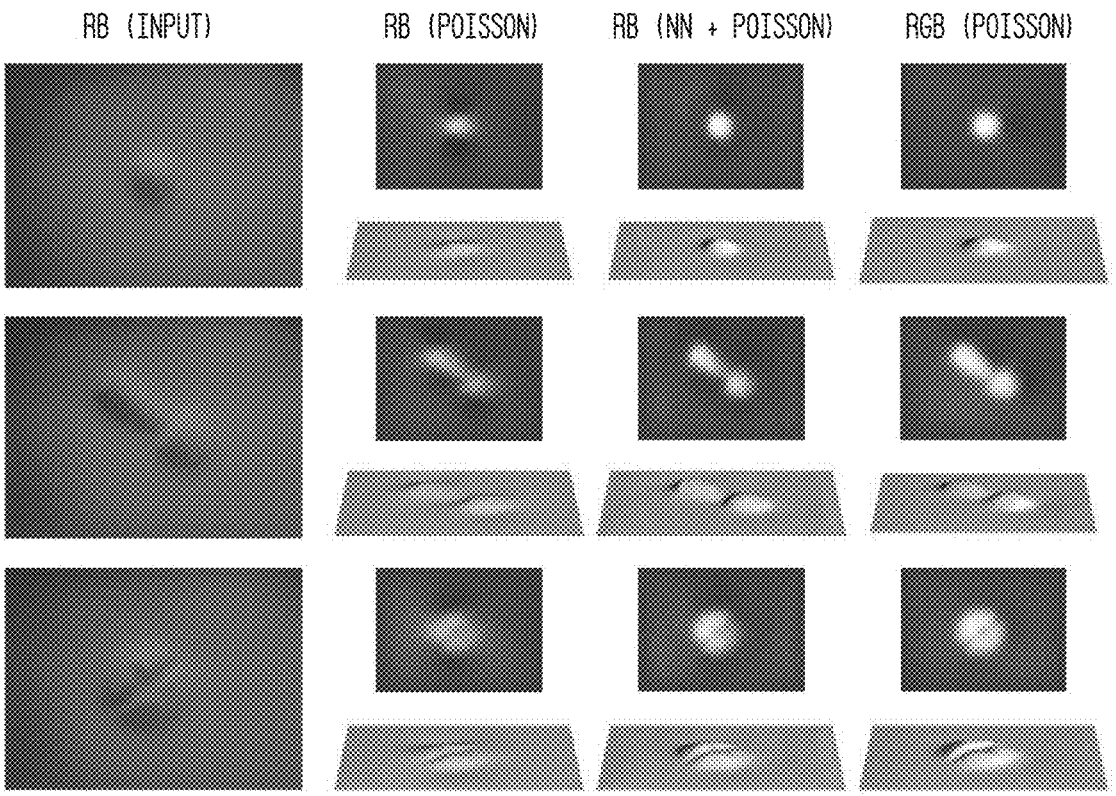
FIG. 7 shows exemplary images obtained by a retrographic sensor and depth information obtained from the images.

Fast Poisson solver requires the gradient of both directions, Gx, and Gy. When there are no lights for an axis, the corresponding gradient information is not provided. In one example, a sensor may not have a green light, corresponding to horizontal gradients Gx. In some embodiments an approximation was used by setting gradient Gx to all zeros and the zeros were input into fast Poisson solver. As shown in FIG. 7, (discussed in further detail below) using zeros for Gx may reconstructed three-dimensional information flattened in the x-axis and generated negative depths to meet constraints.

The inventors have further recognized that second gradients may be obtained from first gradients, in order to meet the requirements of distinguishable color signals for different surface gradients or surface gradients in two different directions to provide photometric stereo. In some embodiments, the techniques described herein achieve higher-fidelity three-dimensional reconstruction and may require fewer calibration images, for example, not more than 30 calibration images.

The inventors have recognized that trained statistical models such as neural networks may be used to generate or enhance gradient information. In some embodiments, raw images were mapped directly to depth. However, three-dimensional reconstruction from raw images is complex, and involves both learning color intensity-to-gradient mapping and solving partial derivative equations. As a result, mapping raw image directly to depth requires thousands of tactile imprints pressing on various shapes to generalize to different shapes and sensors. The inventors have therefore recognized that trained a statistical model to map raw image directly to depth may be cumbersome and impractical.

According to the performed experiments, the trained statistical model was more data-efficient and used only a small amount of calibration data. In some embodiments, a sensor configuration may use such a trained statistical model, such as a neural network, in combination with fast Poisson solver. In some embodiments, the neural network and fast Poisson solver may be combined with and other techniques such as Sim2real.

Three-dimensional reconstruction was also performed with two RB lights from opposite directions and was used with two opposing lights of with different colors. Using two lights from opposite directions resulted in a lack of gradients in one direction, in the example, the horizontal gradients, and fast Poisson solver reconstructed depth with horizontal blur and negative value. The inventors have recognized that a trained statistical model such as a neural network may be used to estimate the missing gradients to significantly improve three-dimensional reconstruction results. The improved three-dimensional reconstruction provided results similar to results of sensors with three RGB lights and requires less real data.

In addition to the above, three-dimensional reconstruction was also performed with different light configurations. With perpendicular lights, for example, RGB, RG, or other perpendicular light configurations, fast Poisson solver without a trained statistical model providing gradient information may provide three-dimensional reconstruction with high fidelity. Without the perpendicular lights, for example, RB, R, or other non-perpendicular light configurations, trained statistical models such as neural networks can be applied to estimate the missing gradients, improving reconstruction results.

Example: Training Data

Inferring Gx from Gy can be done using either real or synthesized data. The inventors have recognized that synthesized data may be used to reduce the amount of real data used to train a model. In one example embodiment, 10,000 random depth images were synthesized and gradients (Gy as input, Gx as output) were calculated for training statistical model such as a neural network model. The inferred Gx and the Gy were then input to fast Poisson Solver. Inferring Gx from Gy instead of using zeros significantly improved the three-dimensional reconstruction with the inferred Gx, without any additional real data, as shown in FIG. 7.

In one example, a neural network model comprised U-Net. In the example, the neural network followed the standard encoder-decoder framework and added multi-scale skip passes to provide more details.

For the training image synthesis process, random surfaces were generated to learn a generic model. Boundaries were flattened and negative depth was removed to match the real data. For details, random arrays ranging from −1 to 1 and cube the values for magnification were generated, boundaries were set to zeros, Gaussian filters with random kernel sizes were applied, negative depth was clipped, and maximal height was randomly scaled within the range of real sensors. If boundaries are not zeros to match the real sensors and provide constraints, artifacts like small bumps between contact regions to the boundary may be generated.

Example: Comparison with Traditional Reconstruction

FIG. 7 shows the depth information generated using various sensor configurations, some of which apply a trained statistical model estimating the gradients Gx. Without the trained statistical model, a fast Poisson solver can only take Gx as zeros, which generated depth with horizontal blur and negative values. With the trained statistical model used to estimate the missing gradients, three-dimensional reconstruction was improved without any extra real data.

Figure 8:
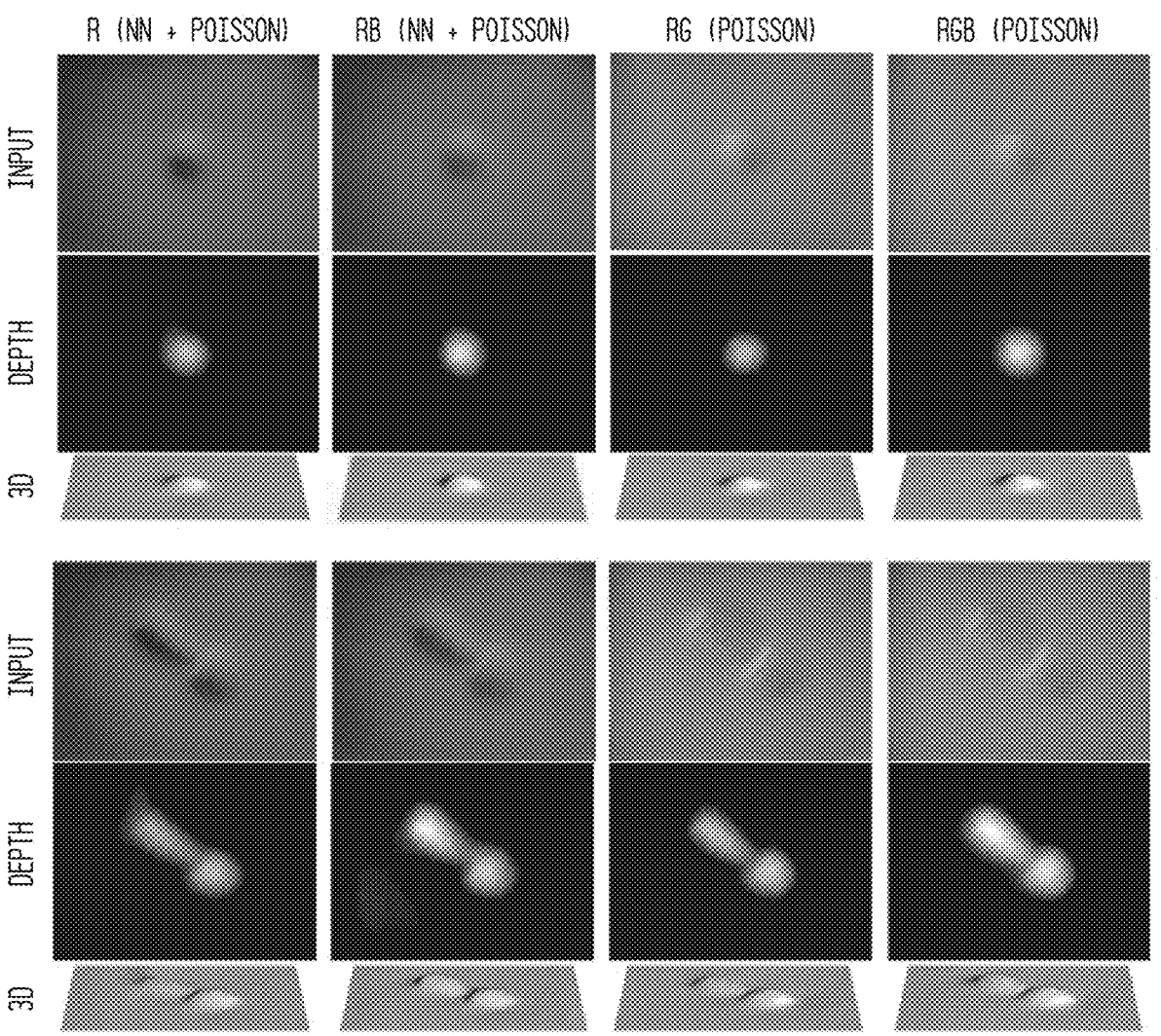
FIG. 8 shows exemplary images obtained by a retrographic sensor and depth information obtained from the images.

FIG. 8 shows a comparison of three-dimensional reconstruction with additional sensor configurations. A sensor with two perpendicular lights, here, RG lights, provided good depth information with the fast Poisson solver alone, and no statistical model. A sensor with two perpendicular lights provided half gradients of Gx and Gy, provided many constraints for the fast Poisson solver. In contrast, a sensor with two non-perpendicular lights, here, RB lights, used a trained statistical model to estimate one gradient from the other (here Gx was estimated from Gy) to achieve comparable results. In one example, three-dimensional reconstruction was performed with only one light. Three-dimensional reconstruction with one light generated artifacts like small bumps between the contact region to the boundary due to too many missing gradients. In one example, one light three-dimensional reconstruction was improved with additional real data.

Table I shows gradient estimation errors with different light configurations for sensors.

TABLE I

| R (no NN) | R (NN) | RB (no NN) | RB (NN) | RG (no NN) |
|---|---|---|---|---|
| Gx error | 0.104 | 0.055 | 0.106 | 0.051 |
| Gy error | 0.055 | 0.055 | 0.045 | 0.045 |
| θx error (degs) | 5.598 | 2.899 | 5.706 | 2.656 |
| θy error (degs) | 2.889 | 2.897 | 2.349 | 2.351 |
| Gx error | 0.104 | 0.055 | 0.106 | 0.051 |
| Gy error | 0.055 | 0.055 | 0.045 | 0.045 |

The trained statistical model provided improved gradient estimation for the missing axis without extra real data. In some examples, a three perpendicular light configuration (such as the RGB example shown in the figures) provided better reconstruction than a two perpendicular light configuration (such as the RG example shown in the figures), which provided better reconstruction than two non-perpendicular opposing lights (such as the RB example shown in the figures), which in turn provided better reconstruction than one light (such as the R example shown in the figures).

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various inventive concepts may be embodied as one or more methods, of which examples have been provided. For example, systems and methods for generating and using trained statistical models have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Figure 9:
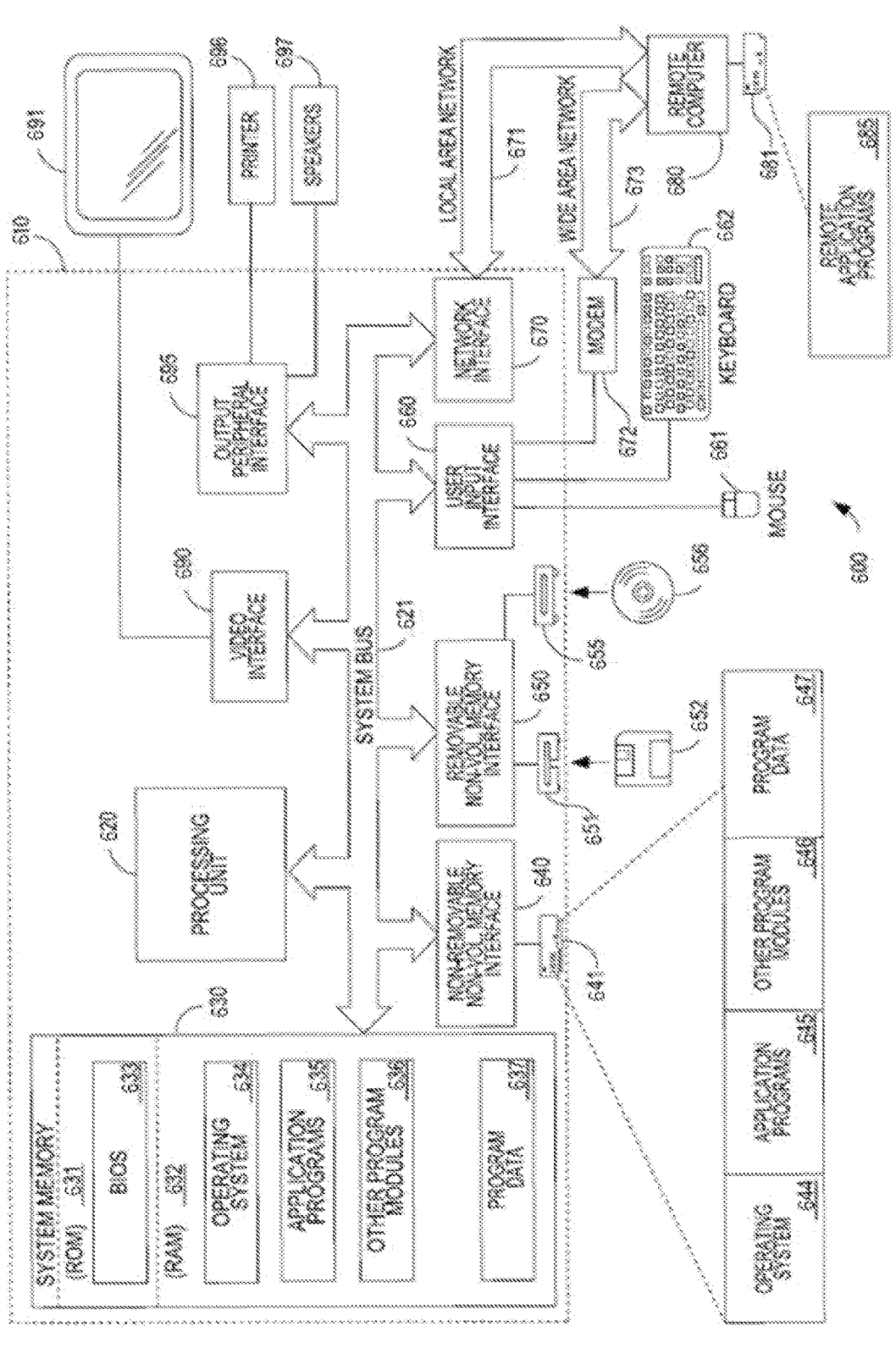
FIG. 9 is a schematic embodiment of a system for training and/or implementing the models disclosed herein.

With reference to FIG. 9, an exemplary system for implementing aspects of the disclosure includes a general-purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random-access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 9 illustrates operating system 634, application programs 635, other program modules 636, and program data 637.

The computer 610 may also include other removable/non-removable, volatile/nonvolatile computer storage media. By way of example only, FIG. 9 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 9, provide storage of computer readable instructions, data structures, program modules and other data for the computer 610. In FIG. 9, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 9. The logical connections depicted in FIG. 9 include a local area network (LAN) 671 and a wide area network (WAN) 673 but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 9 illustrates remote application programs 685 as residing on memory device 681. It will be appreciated that the network connections shown are exemplary and other means of establishing a communications link between the computers may be used.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method comprising:
obtaining first gradients of a parameter along a first direction of an image of a three-dimensional object pressed into an elastomeric pad of a retrographic sensor;
inputting, to a trained statistical model, the first gradients, wherein the trained statistical model is trained to output second gradients of the parameter along a second direction different from the first direction using the first gradients; and
outputting, from the trained statistical model, the second gradients.

2. The method of claim 1, further comprising calculating depth information related to the three-dimensional object using the first gradients and the second gradients.

3. The method of claim 1, wherein the retrographic sensor comprises only one light source, the only one light source being a first light source configured to emit light along a first direction.

4. The method of claim 1, wherein the retrographic sensor comprises only two light sources, the only two light sources being a first light source configured to emit light along a first direction and a second light source configured to emit light along a second direction different than the first direction.

5. The method of claim 1, wherein:
the parameter is an intensity of one or more wavelength bands;
the first gradients of the parameter along the first direction comprise derivatives of the intensity of the one or more wavelength bands along the first direction; and
the second gradients of the parameter along the second direction comprise estimates of derivatives of the intensity of the one or more wavelength bands along the second direction.

6. The method of claim 2, wherein calculating depth information related to the three-dimensional object using the first gradients and the second gradients comprises applying a Poisson solver to the first gradients the second gradients.

7. A method comprising:
obtaining first gradients of a parameter along a first direction of an image of a three-dimensional object pressed into an elastomeric pad of a retrographic sensor;
obtaining training data, wherein the training data comprises second gradients of the parameter along a second direction different from the first direction;
generating a trained statistical model using the first gradients and the training data; and
storing the trained statistical model for subsequent use.

8. A retrographic sensor comprising:
a transparent structure;
a transparent elastomeric pad disposed on a surface of the transparent structure;
a first light source configured to emit light into the transparent structure along a first direction;
at least one computer processor; and
at least one non-transitory computer-readable storage medium encoded with a plurality of instructions that, when executed by at least one computer processor, perform a method comprising:
obtaining first gradients of a parameter along the first direction of an image of a three-dimensional object pressed into the elastomeric pad of the retrographic sensor;
inputting, to a trained statistical model, the first gradients, wherein the trained statistical model is trained to output second gradients of the parameter along a second direction different from the first direction using the first gradients; and
outputting, from the trained statistical model, the second gradients along the second direction.

9. The retrographic sensor of claim 8, wherein the method further comprises calculating depth information related to the three-dimensional object using the first gradients and the second gradients.

10. The retrographic sensor of claim 8, wherein the retrographic sensor comprises only one light source, the only one light source being the first light source.

11. The retrographic sensor of claim 8, wherein the retrographic sensor comprises only two light sources, the only two light sources being the first light source and a second light source configured to emit light along a second direction different than the first direction.

12. The retrographic sensor of claim 8, wherein:
the parameter is an intensity of one or more wavelength bands;
the first gradients of the parameter along the first direction comprise derivatives of the intensity of the one or more wavelength bands along the first direction; and
the second gradients of the parameter along the second direction comprise estimates of derivatives of the intensity of the one or more wavelength bands along the second direction.

13. The retrographic sensor of claim 9, wherein calculating depth information related to the three-dimensional object using the first gradients and the second gradients comprises applying a Poisson solver to the first gradients the second gradients.

14. The retrographic sensor of claim 8, further comprising a photosensitive detector configured to provide the image of the three-dimensional object pressed into the elastomeric pad of the retrographic sensor.

15. A method comprising:
obtaining first gradients of a parameter along a first direction of an image of a three-dimensional object pressed into an elastomeric pad of a retrographic sensor, wherein the retrographic sensor includes at most two light sources configured to illuminate the elastomeric pad in different directions;
inputting, to a trained statistical model, the first gradients; and
calculating depth information related to the three-dimensional object based at least in part on an output from the trained statistical model.

16. The method of claim 15, further comprising outputting, from the trained statistical model, second gradients of the parameter along a second direction different than the first direction.

17. The method of claim 16, wherein:
the parameter is an intensity of one or more wavelength bands;
the first gradients of the parameter along the first direction comprise derivatives of the intensity of the one or more wavelength bands along the first direction; and
the second gradients of the parameter along the second direction comprise estimates of derivatives of the intensity of the one or more wavelength bands along the second direction.

18. The method of claim 15, wherein calculating depth information related to the three-dimensional object using the first gradients comprises applying a Poisson solver to the first gradients.

19. The method of claim 15, further comprising obtaining the image of the three-dimensional object pressed into an elastomeric pad of a retrographic sensor, the image including at most two wavelength bands of two respective light sources of the retrographic sensor.

20. The method of claim 15, wherein calculating the depth information includes the trained statistical model outputting the depth information based on the first gradients.

* * * * *